(12) United States Patent
Hamada et al.

(10) Patent No.: US 8,329,335 B2
(45) Date of Patent: Dec. 11, 2012

(54) SEALED-TYPE SECONDARY BATTERY WITH INTEGRATED BATTERY CONTAINER FORMED WITH A POLYPROPYLENE-BASED RESIN

(75) Inventors: Shinji Hamada, Toyohashi (JP); Toyohiko Eto, Toyota (JP); Kyouei Miura, Hamamatsu (JP); Kenji Fukumoto, Kosai (JP); Daisuke Muramatsu, Toyohashi (JP)

(73) Assignee: Panasonic EV Energy Co., Ltd., Kosai-shi (JP)

( * ) Notice: Subject to any disclaimer, the term of this patent is extended or adjusted under 35 U.S.C. 154(b) by 380 days.

(21) Appl. No.: 12/707,632

(22) Filed: Feb. 17, 2010

(65) Prior Publication Data
US 2010/0209769 A1    Aug. 19, 2010

(30) Foreign Application Priority Data

Feb. 18, 2009 (JP) ................................. 2009-035916
Sep. 28, 2009 (JP) ................................. 2009-222160

(51) Int. Cl.
*H01M 2/00* (2006.01)
*H01M 2/02* (2006.01)
*H01M 2/04* (2006.01)
*H01M 2/08* (2006.01)

(52) U.S. Cl. ......... 429/185; 429/163; 429/176; 429/179

(58) Field of Classification Search .................. 429/185, 429/163, 176, 179
See application file for complete search history.

(56) References Cited

U.S. PATENT DOCUMENTS

| 5,780,180 | A | 7/1998 | Okamoto |
| 6,602,637 | B1 * | 8/2003 | Kurasawa et al. ............ 429/176 |
| 2006/0036032 | A1 * | 2/2006 | Akiyama et al. ................ 525/89 |
| 2009/0068549 | A1 * | 3/2009 | Hamada et al. ................. 429/56 |

FOREIGN PATENT DOCUMENTS

| JP | 9-120801 A | 5/1997 |
| JP | 2007-35491 A | 2/2007 |
| JP | 2008311015 A | * 12/2008 |

* cited by examiner

*Primary Examiner* — Basia Ridley
*Assistant Examiner* — Sean P Cullen
(74) *Attorney, Agent, or Firm* — Christensen O'Connor Johnson Kindness PLLC

(57) ABSTRACT

A sealed-type secondary battery is disclosed. A battery module of a sealed-type secondary battery is formed by heating and fusing a top lid member and an integrated battery container. The integrated battery container is formed with a polymer alloy including a polyphenylene ether resin and a polyolefin resin, and the top lid member or a lateral lid member is formed with a polypropylene-based resin. A nucleating agent is added to the polypropylene-based resin of the top lid member or the lateral lid member, to improve mechanical strength, and the molecular weight is increased to reduce a melt flow rate MFR to approximately the same degree as the polymer alloy.

5 Claims, 7 Drawing Sheets

| THERMAL PROPERTY VALUE | GENERAL-PURPOSE PP | POLYMER ALLOY (PP+PPE) | EMBODIMENT |
|---|---|---|---|
| LOAD DEFLECTION TEMPERATURE (0.45MPa) | 115°C | 134°C | 130°C |
| CRYSTALLIZATION TEMPERATURE | 120°C | 128°C | 124°C |
| MELTING TEMPERATURE | 160°C | 167°C | 165°C |
| MFR (250°C98N) | 30~40g/10min | 0.45g/10min | 0.6g/10min |
| COMMUNICATION HOLE MAINTAINING CAPABILITY | × | ○ | ○ |

FIG. 6

SEALED-TYPE SECONDARY BATTERY WITH INTEGRATED BATTERY CONTAINER FORMED WITH A POLYPROPYLENE-BASED RESIN

PRIORITY INFORMATION

This application claims priority to Japanese Patent Application Nos. 2009-035916, filed on Feb. 18, 2009 and 2009-222160, filed on Sep. 28, 2009, which are incorporated herein by reference in their entirety.

BACKGROUND OF THE INVENTION

1. Field of the Invention

The present invention relates to a sealed-type secondary battery, and in particular to a material of the sealed-type secondary battery.

2. Description of the Related Art

In the related art, there is known a battery pack in which a plurality of battery modules including a plurality of unit cells are arranged and integrally constrained by endplates on both ends. A battery pack is a secondary battery (nickel-metal hydride battery or lithium ion battery) which is used as a power supply of an electric automobile and a hybrid automobile. In order to secure safety and simplify maintenance, the battery pack is set as a sealed type in which gas occurring inside the battery is not discharged to the outside of the battery system and which does not require replenishment of the liquid.

FIG. 7 is a perspective view of a unit cell 4 which is a part of a sealed-type secondary battery disclosed in JP Hei 9-120801 A. An electrode plate 11 in which a plurality of positive electrode plates and negative electrode plates are alternately arranged with a separator therebetween and an alkali electrolyte solution are stored in a rectangular battery container 1 made of a synthetic resin, and a lid 12 made of a synthetic resin is adhered to an upper-portion opening of the battery container 1. The lid 12 comprises a rib 14 on an outer surface of a wide side wall 13, similar to a rib 5 of the battery container 1, and the lid 12 and the battery container 1 are adhered to each other by heating and fusing. On the lid 12, a positive electrode terminal 16, a negative electrode terminal 17, and a safety valve 18 are fixed. The fixing of the safety valve 18 is achieved by adhesion through heating and fusing to the lid 12, similar to the battery container 1. A lead piece 19 of the negative electrode plate is connected through welding to a hanging portion at a lower end of the negative electrode terminal 17, and an upper portion of the negative electrode terminal 17 is fixed to the lid 12 in a liquid-tight and air-tight manner. The document discloses that, in such a structure, a polymer alloy having polyphenylene ether resin and a polyolefin resin as primary constituents is used as the synthetic resin of the container including the battery container 1 and the lid 12.

The polymer alloy is superior in mechanical strength such as bending modulus of elasticity compared to the general-purpose polyolefin resin, and thus the battery characteristics can be improved without being damaged by creep deformation. On the other hand, the polymer alloy is more expensive than the general-purpose polyolefin resin, and is disadvantageous for mass production in view of the cost. In addition, there is also a problem in the molding in that the molding component cost is also high, such as high percentage of foreign object deficiency due to generation of carbides.

SUMMARY OF THE INVENTION

The present invention advantageously provides a sealed-type secondary battery which can inhibit increase in the manufacturing cost while having sufficient mechanical strength and preventing creep deformation.

According to one aspect of the present invention, there is provided a sealed-type secondary battery which uses a battery container comprising an integrated battery container in which a plurality of battery containers having a rectangular parallelepiped shape with a short-side surface having a narrow width, a long-side surface having a wide width, and an opening on an upper surface are integrally connected with each other while sharing the short-side surfaces, and a top lid member which integrally closes the integrated battery container, wherein the integrated battery container and the top lid member are formed with a polymer alloy having a polyphenylene ether resin and a polyolefin resin as primary constituents, a lateral lid member which is provided on the long-side surface of the integrated battery container is formed with a polypropylene-based resin, and the polypropylene-based resin of the lateral lid member has a melt flow rate MFR under a condition of 250° C. and a load condition of 98 N of 0.4 g/10 min~1.3 g/10 min, and has an MFR of approximately the same degree as the polymer alloy of the integrated battery container.

According to another aspect of the present invention, there is provided a sealed-type secondary battery which uses a battery container comprising an integrated battery container in which a plurality of battery containers having a rectangular parallelepiped shape with a short-side surface having a narrow width, a long-side surface having a wide width, and an opening on an upper surface are integrally connected with each other while sharing the short-side surface, and a top lid member which integrally closes the integrated battery container and in which the integrated battery container and the top lid member are heated and fused, wherein the integrated battery container is formed with a polymer alloy having a polyphenylene ether resin and a polyolefin resin as primary constituents, and the top lid member is formed with a polypropylene-based resin, and the polypropylene-based resin of the top lid member has a melt flow rate MFR under a condition of 250° C. and a load condition of 98 N of 0.4 g/10 min~1.3 g/10 min, and has an MFR of approximately the same degree as the polymer alloy of the integrated battery container.

According to another aspect of the present invention, it is preferable that, in the sealed-type secondary battery, the polypropylene-based resin has a weight average molecular weight Mw of greater than or equal to 700000, and a ratio Mw/Mn between the weight average molecular weight Mw and a number average molecular weight Mn of greater than or equal to 4.8. According to another aspect of the present invention, it is preferable that, in the sealed-type secondary battery, a safety valve which discharges, to the outside, gas generated inside is provided on the top lid member, and the safety valve is formed with the same polypropylene-based resin as the top lid member.

According to another aspect of the present invention, it is preferable that, in the sealed-type secondary battery, a nucleating agent is added to the polypropylene-based resin.

According to various aspects of the present invention, the increase in the manufacturing cost can be inhibited by forming at least one of the top lid member and the lateral lid member with the polypropylene-based resin while forming the integrated battery container with the polymer alloy. In the polypropylene-based resin of the top lid member or the lateral lid member, with the increase in the molecular weight, the melt flow rate MFR is reduced to approximately the same degree as the polymer alloy, and thus the heating and fusing is simplified. The sealed-type secondary battery according to various aspects of the present invention can be formed using the same process as the heating and fusing process which is used when all of the integrated battery container, the top lid member, and the lateral lid member are formed with a polymer alloy. In addition, when the polymer alloy is used, a black-dot foreign object may occur due to generation of carbides, which may cause cracks. By forming the top lid member or the lateral lid member with the polypropylene-based resin, generation of the carbides is inhibited, the occurrence of cracks can be inhibited, and deficiency caused by the occurrence of cracks can be effectively prevented. In particular, normally, the lateral lid member is a part where damage due to generation of cracks occurs to a larger extent, and thus the advantage of using the polypropylene-based resin is significant.

BRIEF DESCRIPTION OF THE DRAWINGS

FIG. 6 is a table showing physical property values of a preferred embodiment of the present invention.

DESCRIPTION OF THE PREFERRED EMBODIMENT

A preferred embodiment of the present invention will now be described with reference to the drawings. The preferred embodiment is provided merely for exemplary purposes, and the present invention is not limited to the preferred embodiment.

Figure 1:
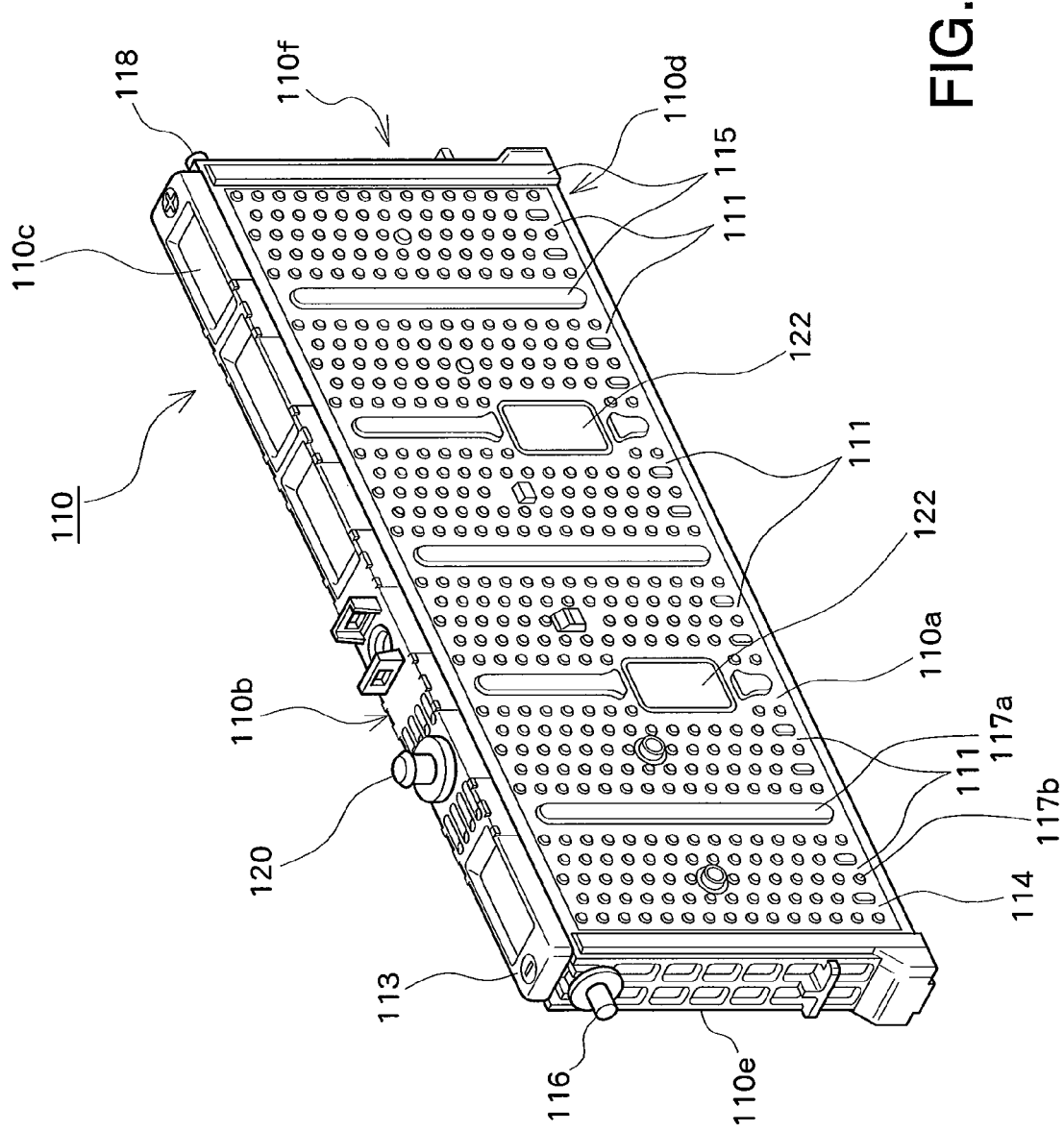
FIG. 1 is a perspective view of a battery module according to a preferred embodiment of the present invention.

FIG. 1 shows a structure of a nickel-metal hydride secondary battery module 110 having a battery capacity (nominal capacity) of 6.5 Ah, which uses a battery casing made of a synthetic resin according to a preferred embodiment of the present invention. The battery module 110 comprises an integrated battery container 114 in which a plurality (in FIG. 1, six) of battery containers 111 having a rectangular parallelepiped shape with a short-side surface having a narrow width, a long-side surface having a wide width, and an opening at an upper surface, are integrally connected with each other while sharing the short-side surface, and the upper surface openings of the battery containers 111 are integrally closed by an integral top lid member 113. In each battery container 111, electrode plates including a plurality of positive electrode plates and a plurality of negative electrode plates layered with a separator therebetween are stored with an electrolyte solution, and a unit cell is formed. The negative electrode plate is an electrode plate having a hydrogen-occluding alloy as a negative electrode plate constituting member, and the positive electrode plate is an electrode plate having an active material including nickel hydride. The separator is a nonwoven fabric comprising a resin to which a hydrophilization process is applied, and the electrolyte solution is an aqueous solution of alkali including KOH. As shown in FIG. 1, each battery module 110 has an approximate rectangular parallelepiped shape with two long-side surfaces 110a and 110b which oppose each other, two short-side surfaces 110e and 110f which oppose each other, and an upper surface 110c and a bottom surface 110d which oppose each other. On the long-side surfaces 110a and 110b, a rib 117a which extends in a vertical direction is provided in a protruding manner, and a relatively small circular protrusion 117b is provided in a protruding manner in a matrix form between the ribs. In addition, a lateral lid member 122 is provided crossing a part of the ribs.

Figure 2:
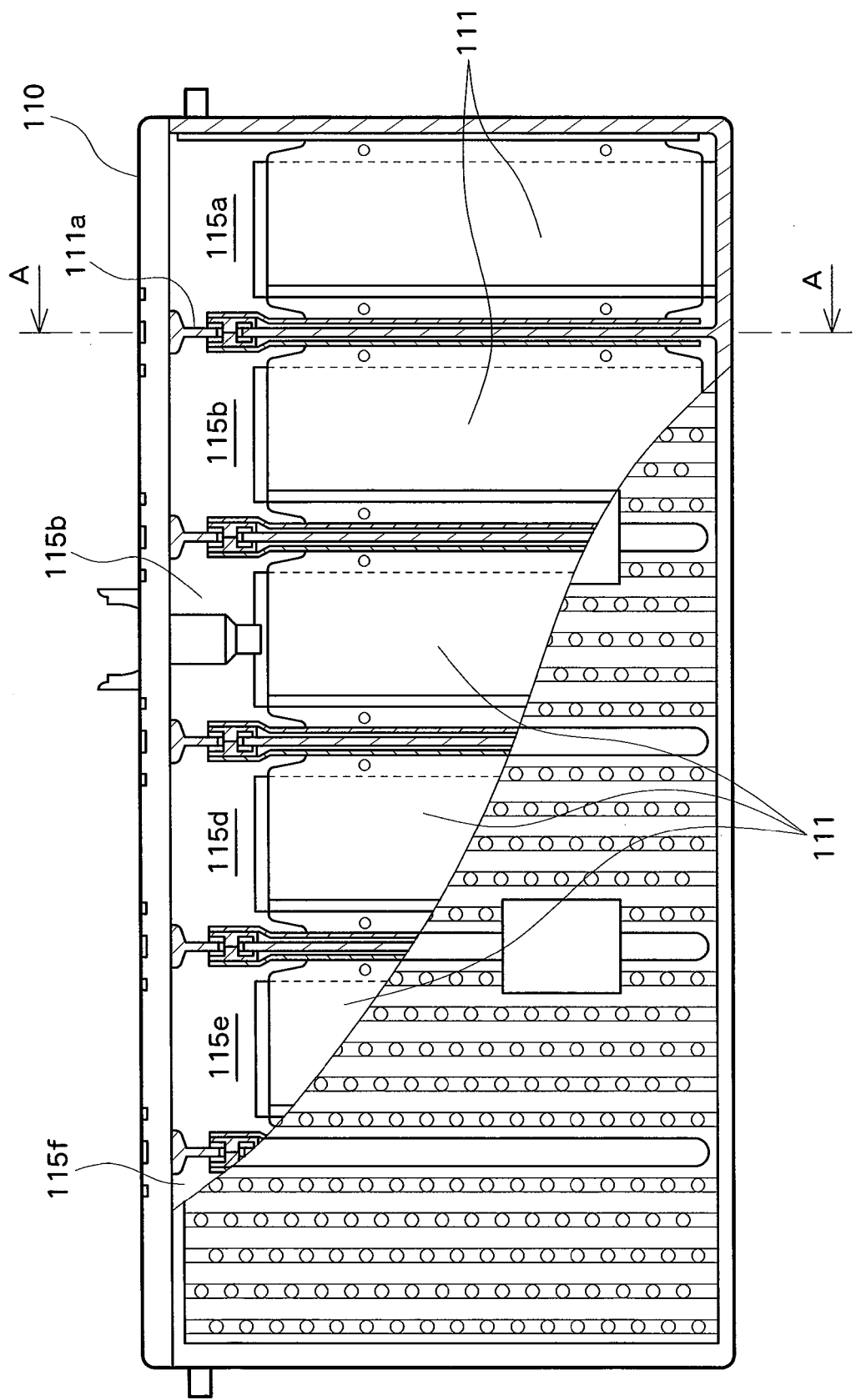
FIG. 2 is a partially-broken explanatory diagram of FIG. 1.
Figure 3:
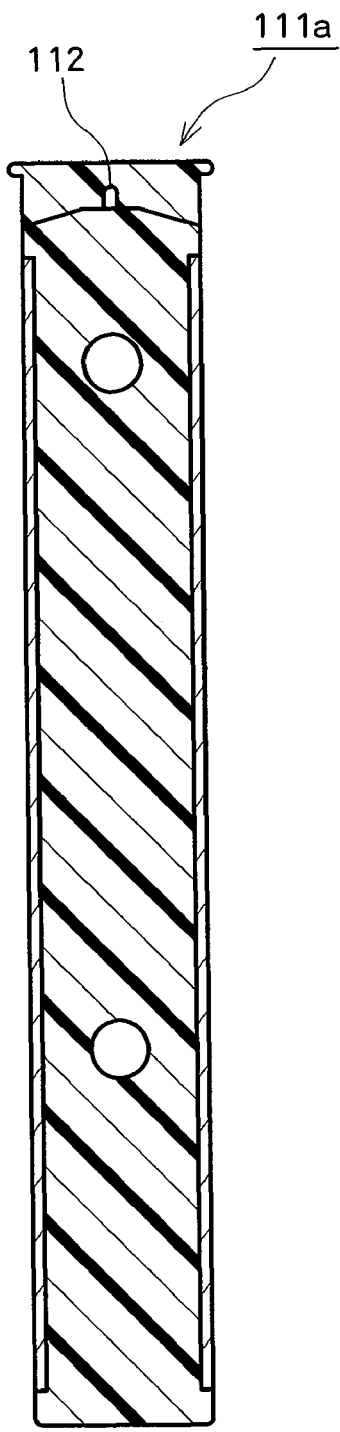
FIG. 3 is an A-A cross sectional diagram of FIG. 2.

A plurality (in FIG. 1, six) of unit cells 111 arranged in a line in the battery module 110 are connected in series at the upper portion of the integrated battery container wall. In addition, the unit cells are connected in series with a wall therebetween at a wall portion positioned on the lateral lid member 122. On the top lid member 113, a safety valve 120 which discharges gas discharged from each unit cell to the outside is provided. On the side near the top lid member of the wall separating the unit cells 111, very small communication holes (for example, with a minimum cross sectional area of the hole of 0.4 mm$^2$) are formed, and when gas occurs from any of the unit cells 111, the gas can be safely discharged to the outside through the communication hole and the safety valve 120. FIG. 2 shows the unit cell 111 and a storage 115 for storing the unit cell 111. The unit cell 111 is stored in each of storage sections 115a~115f. The storage sections 115a~115f are separated by walls 111a. FIG. 3 shows a vertical cross section (A-A cross section in FIG. 2) of the wall 111a. The wall 111a has a communication hole 112 which passes through the wall thickness direction (direction into the page of FIG. 3) at an upper part (top lid member-side wall portion) of the wall 111a. With this structure, gas above adjacent storages with the wall 111 therebetween is allowed to flow between the adjacent storages. The size of the communication hole 112 is preferably very small so that hydrogen gas which is generated from each unit cell can easily move, but movement of oxygen gas is limited.

On a side of the short-side surface 110e of the battery module 110, an external negative electrode terminal 116 which protrudes toward the outside of the module is provided, and on a side of the short-side surface 110f, an external positive electrode terminal 118 which protrudes toward the outside of the module is provided. The integrated battery container 114 including the long-side surfaces 110a and 110b, bottom surface 110d, and short-side surfaces 110e and 110f, and the top lid member 113 are adhered by heating and fusing, and the integrated battery container 114 and the lateral lid member 122 are adhered through heating and fusing.

Figure 4:
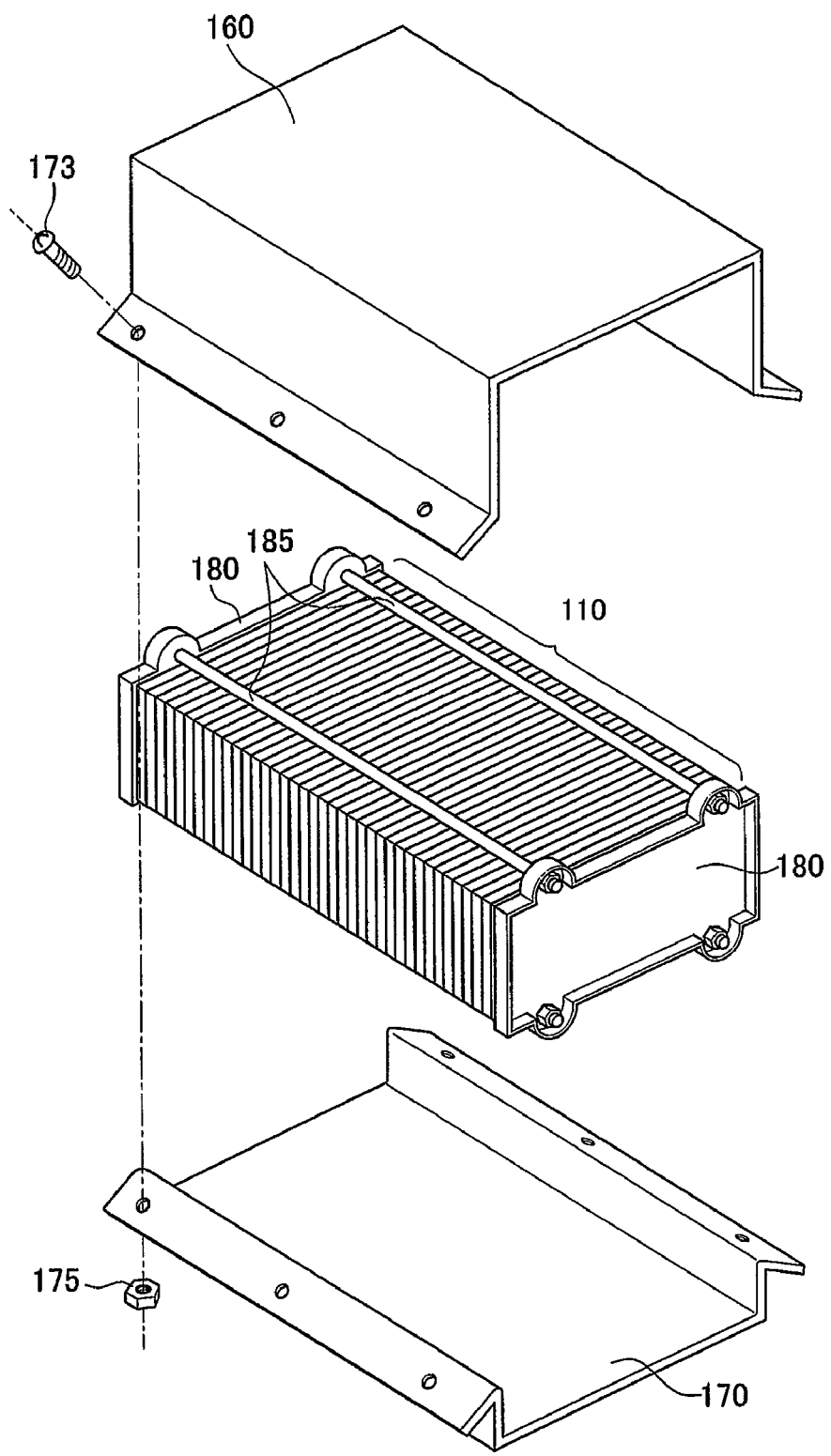
FIG. 4 is an exploded perspective view of a battery pack.
Figure 5A:
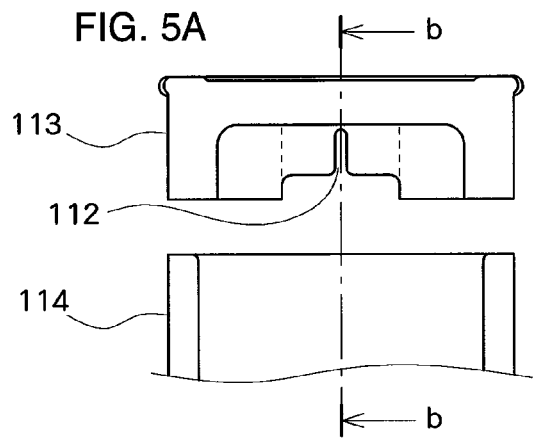
FIG. 5 is an explanatory diagram of a heating and fusing process.
Figure 5B:
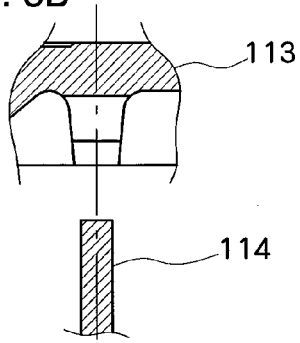
Figure 5C:
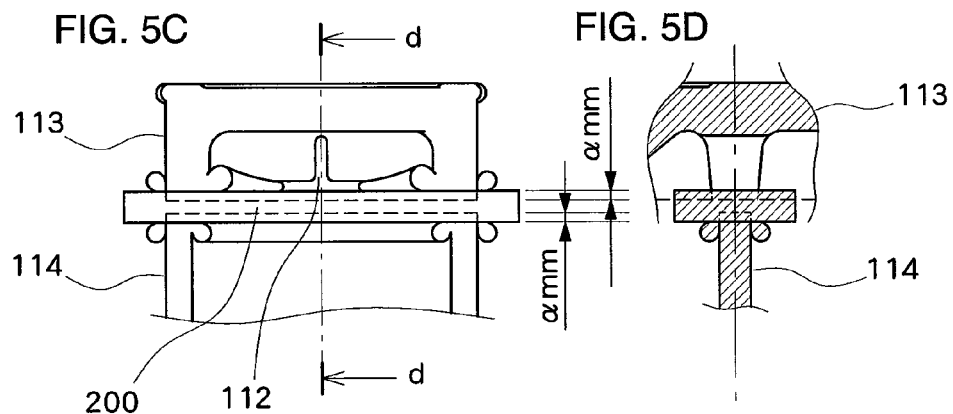
Figure 5D:
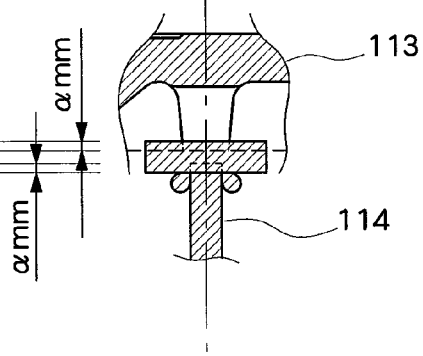
Figure 5E:
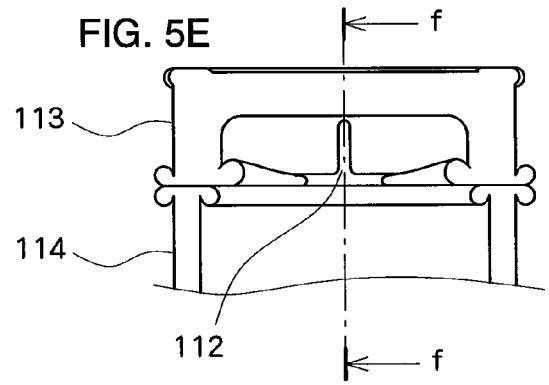
Figure 5F:
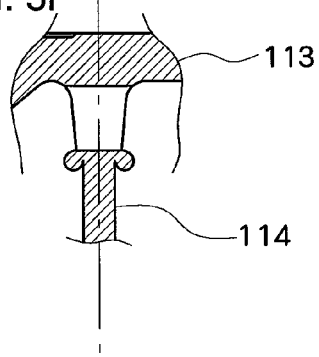
Figure 5G:
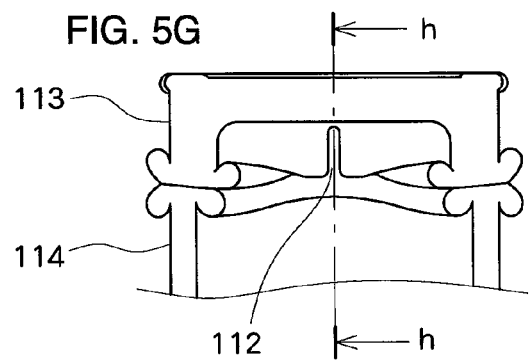
Figure 5H:
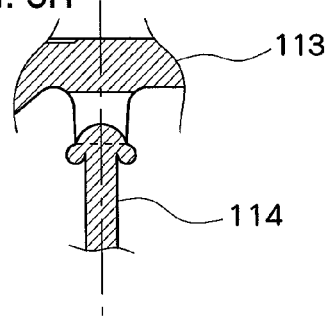
Figure 7:
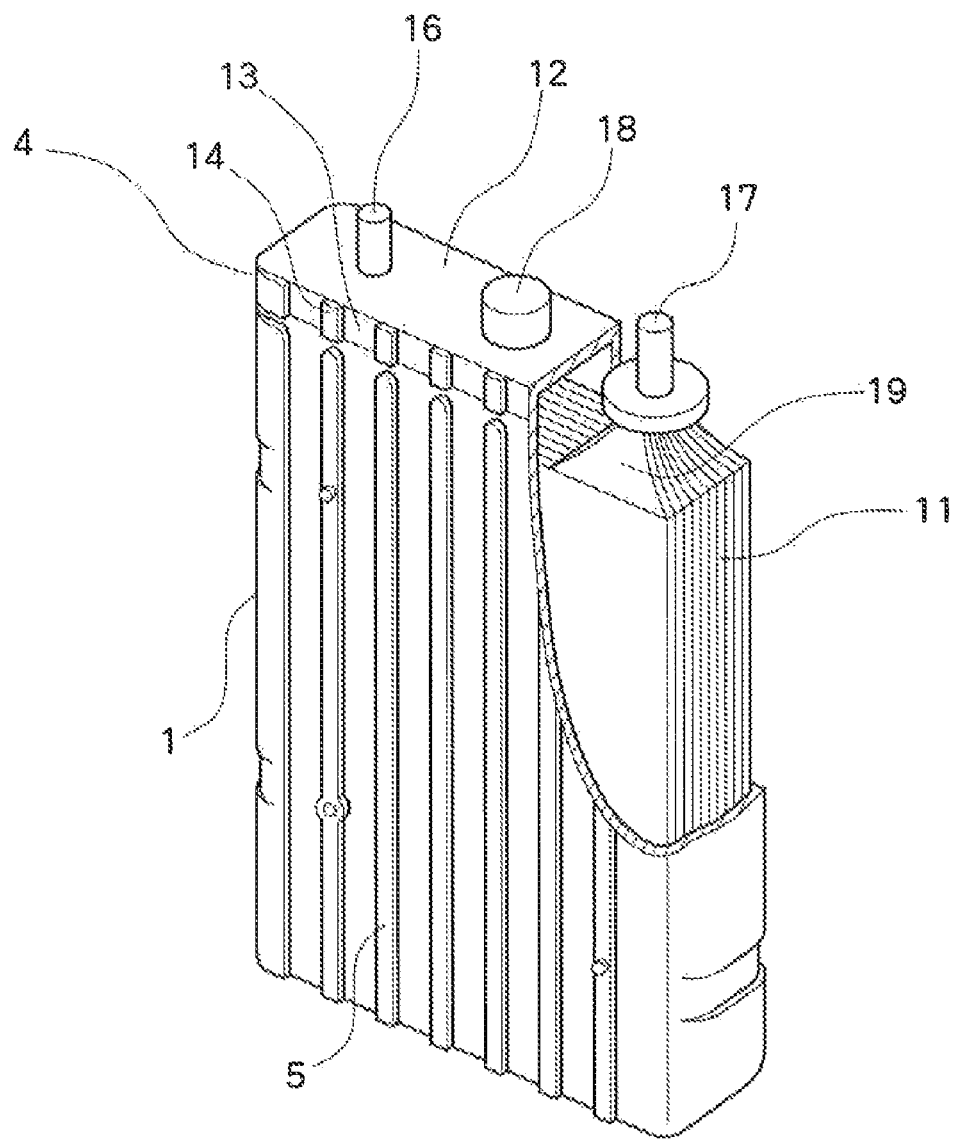
FIG. 7 is a perspective view of a battery pack of related art.

FIG. 4 shows a state where the structure is assembled as a battery pack. As shown in FIG. 4, the battery modules are integrated by being constrained as a whole by two end plates (end board) 180 and four constraint rods 185. Because ribs 117a extending in the vertical direction and circular protrusions 117b placed in a matrix form are provided in a protruding manner on the long-side surfaces 110a and 110b of the integrated battery container 114, when the battery modules 110 are placed in parallel to each other overlapping the long-side surfaces of the battery modules 110, the ribs 117a and the circular protrusions 117b of adjacent battery modules 110 contact each other, and a coolant passage can be formed around the rib 117a and the circular protrusion 117b. In addition, the battery pack is held by an upper case 160 and a lower case 170. The upper case 160 and the lower case 170 are fixed with a bolt 173 and a nut 175.

FIG. 5 shows an example step of heating and fusing the top lid member 113 to the integrated battery container 114. FIG. 5 shows junction of the wall portion on the side near the top lid member and the wall portion on the side near the integrated battery container. The process of heating and fusing proceeds in the order of FIGS. 5(a), 5(c), 5(e), and 5(g). FIGS. 5(b), 5(d), 5(f), and 5(h) are cross sectional views of FIGS. 5(a), 5(c), 5(e), and 5(g), respectively. First, the positions of the top lid member 113 and the integrated battery container 114 are set to desired positions. Then, a heat plate 200 at a predetermined temperature T ° C. (180° C.~300° C.) is placed between the top lid member 113 and the integrated battery container 114, and the top lid member 113 and the integrated battery container 114 are heated for a predetermined time t1 seconds (for example, 30 seconds), to melt a predetermined amount α mm of the top lid member 113 and of the integrated battery container 114. Next, in the melted state, the top lid member 113 is pressed with respect to the integrated battery container 114 by a predetermined amount β mm, to fit the top lid member 113, and the fitted state is maintained for a predetermined time t2, for fusion.

In this manner, when the top lid member 113 and the integrated battery container 114 are adhered through heating and fusing, the same heat plate 200 is used to melt the top lid member 113 and the integrated battery container 114 for the same amount α mm. Thus, the top lid member 113 and the integrated battery container 114 are required to have approximately identical thermal property values. With the use of the polymer alloy having the polyphenylene ether resin and the polyolefin resin as the primary constituents for the top lid member 113 and the integrated battery container 114 as in the related art, the equality in the thermal property values can be secured, but the cost would be increased.

In consideration of this, in the present embodiment, of the battery module 110, a part which particularly requires a high pressure endurance, more specifically the integrated battery container 114, is formed with a polymer alloy of polyphenylene ether resin and polyolefin resin including 20 weight % to 80 weight % of polyphenylene ether resin, for example, a polymer alloy of polyphenylene ether (PPE) and polypropylene (PP), and the top lid member 113, the lateral lid member 122, and the safety valve 120 are formed using a polypropylene-based resin which is not expensive, in place of the polymer alloy. By forming the top lid member 113 and the lateral lid member 122, etc. with the polypropylene-based resin, it is possible to reduce the cost of the overall battery module 110. On the other hand, because the polypropylene-based resin and the polymer alloy generally have different thermal property values, it is difficult to heat and fuse the top lid member 113 and the lateral lid member 122 with the integrated battery container 114 without further processing, and it is also difficult to heat and fuse the top lid member 113 and the lateral lid member 122 with the integrated battery container 114 by employing identical steps to those when the top lid member 113, the lateral lid member 122, and the integrated battery container 114 are formed with a same synthetic resin. In particular, because the communication hole 112 is formed in the top lid member 113, as is clear from FIGS. 3 and 5, the fluidity of the top lid member 113 must be inhibited in order to prevent melting of the lower end of the top lid member 113 during melting of the top lid member 113, flowing of the melted portion to the inside of the top lid member 113, and clogging of the communication hole 112 by the melted portion.

For this purpose, in the present embodiment, the molecular weight of the polypropylene-based resin forming the top lid member 113, the lateral lid member 122, and the safety valve 120 is increased and a nucleating agent is added so that the thermal property values become as close as possible to those of the polymer alloy which is the forming material of the integrated battery container 114. That is, a nucleating agent is added to the polypropylene-based resin to promote nucleation, to increase the bending strength and tensile strength. In addition, by increasing the molecular weight of the polypropylene-based resin, the fluidity is reduced (viscosity is increased). The operation and advantage when the nucleating agent is added to a polymer material is not precisely known, but in general, it is thought that, when the nucleating agent is added, nucleation is promoted, the number of nuclei is increased, spherulite is refined and molecular chain connecting the spherulites is increased, and the mechanical strength is increased. With regard to the higher molecular weight, while the weight average molecular weight Mw of the general-purpose polypropylene resin (PP) is 340000 and a ratio Mw/Mn between the weight average molecular weight Mw and a number average molecular weight Mn of the general-purpose polypropylene resin is 3.3, the weight average molecular weight Mw of the polypropylene-based resin of the present embodiment is 748400 and the ratio Mw/Mn between the weight average molecular weight Mw and the number average molecular weight Mn of the polypropylene-based resin of the present embodiment is 5.0. The weight average molecular weight Mw and the number average molecular weight Mn are measured through gel permeation chromatography.

FIG. 6 shows thermal property values of test pieces of the general-purpose polypropylene resin (general-purpose PP), polymer alloy (PP+PPE), and polypropylene-based resin of the present embodiment (embodiment), in comparison with each other. While load deflection temperatures (0.45 MPa) are 115° C. for the general-purpose PP and 134° C. for the polymer alloy, the load deflection temperature (0.45 MPa) for the material of the embodiment is 130° C., a value close to the polymer alloy. While the crystallization temperatures are 120° C. for the general-purpose PP and 128° C. for the polymer alloy, the crystallization temperature is 124° C. for the material of the embodiment, a value which is close to the polymer alloy. While the melting temperatures are 160° C. for the general-purpose PP and 167° C. for the polymer alloy, the melting temperature is 165° C. for the material of the embodiment, a value which is close to the polymer alloy. MFR (melt flow rate) is a physical property value representing fluidity, and is a value measured at 250° C. and 98N. While the MFR is 30 g/10 min~40 g/10 min for the general-purpose PP and 0.45 g/10 min for the polymer alloy, the MFR for the material of the embodiment is 0.6 g/10 min, a value which is close to the polymer alloy. FIG. 6 also shows a result of whether or not the size (minimum cross sectional area of the hole of 0.4 mm$^2$) and shape of the communication hole 112 provided on the wall are maintained during heating and fusing, when the top lid member 113 molded using a same material as the test piece and the integrated battery container molded using the polymer alloy (PP+PPE) are heated and fused. In the general-purpose PP, the MFR (melt flow rate) is relatively high and the size and shape of the communication hole 112 cannot be maintained. In the embodiment, on the other hand, because a MFR of approximately the same degree as the polymer alloy is obtained, the size and shape of the communication hole 112 can be maintained.

In this manner, by adding the nucleating agent to the polypropylene-based resin to increase the mechanical strength and increasing the molecular weight of the polypropylene-based resin to reduce the MFR (melt flow rate) so that the thermal property values approximately match the thermal property values of the polymer alloy, it is possible, even when the polypropylene-based resin is used for the top lid member 113 and the polymer alloy is used for the integrated battery container 114, to reliably heat and fuse the top lid member 113 and the integrated battery container 114 while maintaining the small communication hole 112 provided on the side of the top lid member of the wall at a predetermined size. In addition, with the use of the polypropylene-based resin having approximately matching thermal property values as the polymer alloy, for the top lid member 113 and the lateral lid member 122, it is possible to use, without a change, the heating and fusing process used in the case when all of the members including the top lid member 113, the lateral lid member 122, and the integrated battery container 114 are formed with the polymer alloy. As a result, an increase in the manufacturing cost can be inhibited. Moreover, in the polymer alloy, the percentage of foreign object deficiency due to occurrence of carbides during formation is relatively high. More specifically, a black-dot foreign object occurs due to generation of the carbide, which causes cracks. By forming the top lid member 113 and the lateral lid member 122 with the polypropylene-based resin, it is possible to inhibit generation of the carbides, and consequently inhibit generation of cracks on the top lid member 113 and the lateral lid member 122 and effectively prevent crack generation deficiency. In particular, inhibition of the generation of the crack with the use of the polypropylene-based resin for the lateral lid member 122 is more effective than the use of the polypropylene-based resin for other portions. This is because when the battery module 110 is expanded due to generation of gas inside the battery, a large pressure is applied on the long-side surface having a larger area, and in addition, because the strength of the lateral lid member 122 is reduced due to the heating and fusing, more damage tends to occur in the lateral lid member 122 due to the generation of the cracks than in the other portions. Moreover, as shown in FIG. 4, in the assembled state as a battery pack, the long-side surfaces of the battery modules 110 are adjacent to each other, and thus it is difficult to apply physical strengthening for the lateral lid member 122. This is another reason why the use of the polypropylene-based resin for the lateral lid member 122 is effective.

In the present embodiment, the molecular weight of the polypropylene-based resin is increased to reduce the MFR. The present inventors have measured, for test piece samples of various polypropylene-based resins, Mw, Mw/Mn, bending modulus of elasticity (23° C.), bending strength (23° C.), tensile rupture elongation, and MFR, and have obtained the following results.

Comparative Example 1

Single Polymer of General-Purpose Propylene

Mw=340000, Mw/Mn=3.3, bending modulus of elasticity=1800 MPa, bending strength=52 MPa, tensile rupture elongation=20, MFR=30 g/10 min Comparative Example 2

Single Polymer of Propylene

Mw=610000, Mw/Mn=4.0, bending modulus of elasticity=2030 MPa, bending strength=59 MPa, tensile rupture elongation=11, MFR=2.0 g/10 min Sample 1

Single Polymer of Propylene

Mw=700000, Mw/Mn=4.8, bending modulus of elasticity=2020 MPa, bending strength=58 MPa, tensile rupture elongation=90, MFR=1.0 g/10 min Sample 2

Block Co-Polymer of Propylene-Ethylene

Mw=748400, Mw/Mn=5.0, bending modulus of elasticity=1800 MPa, bending strength=53 MPa, tensile rupture elongation=80, MFR=0.6 g/10 min The comparative example 1 is general-purpose polypropylene, and the comparative example 2 and the sample 1 are polypropylene which uses a single polymer of propylene. The sample 2 is a block co-polymer of propylene-ethylene, and uses a co-polymer of propylene-ethylene having a single polymer of propylene and a random co-polymer of propylene-ethylene. The weight percentage of the portion of the random co-polymer of propylene-ethylene with respect to the block co-polymer of the propylene-ethylene in the sample 2 is 20 weight %, and the ethylene content in the random co-polymer of ethylene-propylene is 1 weight %. The comparative example 1 corresponds to the general-purpose PP of FIG. 6 and the sample 2 corresponds to the embodiment of FIG. 6. In view of the communication hole maintaining characteristic, in the comparative example 2, the size and shape of the communication hole 112 cannot be maintained, similar to the comparative example 1. The MFR of the sample 1 is slightly larger than the sample 2, but the communication hole maintaining characteristic is superior, and thus the top lid member 113 and the integrated battery container 114 can be heated and fused in a state where the small communication hole 112 provided on the side of the top lid member of the wall is maintained at a predetermined size.

The load deflection temperature conforms with ASTM D648 and is a deflection temperature measured under a load of 0.45 MPa. The tensile rupture elongation conforms with ASTM D638, and is a percentage (%) of elongation until rupture. The crystallization temperature and melting temperature conform with JIS K7121, and are measured by DSC (differential scanning calorimeter). The MFR conforms with ASTM D1238 and is measured at 250° C. and a load of 98N. In the comparative example 2 and samples 1 and 2, sodium 2,2'-methylene bis(4,6-di-t-butylphenyl)phosphate is added as a nucleating agent. With the above-described configuration, in order to obtain the MFR close to the polymer alloy, more specifically, MFR=0.4 g/10 min~1.3 g/10 min (more preferably, 0.45 g/10 min~1.0 g/10 min) under the conditions of 230° C. and a load of 98 N, that is, MFR necessary for maintaining the size and shape of the communication hole 112 in the heating and fusing process, it is desirable, in general, to have the weight average molecular weight Mw of greater than or equal to 700000 and Mw/Mn of greater than or equal to 4.8. When the weight average molecular weight Mw is excessively large, the MFR may become too low and the injection molding capability may be reduced. Therefore, the upper limit of the weight average molecular weight Mw is desirably determined from the viewpoint of the molding capability and the viewpoint of maintaining the match with the MFR of the polymer alloy, and is set to, for example, 1000000.

As the polypropylene-based resin in the present embodiment, a single polymer of polypropylene, a random co-polymer of propylene-ethylene, a block co-polymer having a single polymer of propylene and a random co-polymer of propylene-ethylene, or the like, may be used, and the polypropylene-based resin may be manufactured using a well-known polymerization catalyst. As the polymerization catalyst, for example, Ziegler catalyst and metallocene catalyst are known, and as the polymerization method, slurry polymerization and gas phase polymerization are known. The molecular weight can be increased by adjusting the polymerization time. In addition, as the nucleating agent in the present embodiment, for example, sodium 2,2'-methylene bis(4,6-di-t-butylphenyl)phosphate, [2,2'-methylene bis(4,6-di-t-butylphenyl)phosphate]dihydroxy aluminum, bis[2,2'-methylene bis(4,6-di-t-butylphenyl)phosphate]hydroxy aluminum, tris[2,2'-methylene bis(4,6-di-t-butylphenyl)phosphate]aluminum, sodium bis(4-t-butylphenyl)phosphate, metal benzoate such as sodium benzoate and p-t-butyl aluminum benzoate, 1,3:2,4-bis(o-benzylidene) sorbitol, 1,3:2,4-bis(o-methyl benzylidene) sorbitol, 1,3:2,4-bis(o-ethyl benzylidene) sorbitol, 1,3-o-3,4-dimethyl benzylidene-2,4-o-benzylidene sorbitol, 1,3-o-benzylidene-2,4-o-3,4-dimethyl benzylidene sorbitol, 1,3:2,4-bis(o-3,4-dimethyl benzylidene) sorbitol, 1,3-o-p-chloro benzylidene-2,4-o-3,4-dimethyl benzylidene sorbitol, 1,3-o-3,4-dimethyl benzylidene-2,4-o-p-chloro benzylidene sorbitol, 1,3:2,4-bis(o-p-chloro benzylidene) sorbitol, and a mixture of these compounds, and a compound of rosin-based alkali metal salt or alkaline earth metal salt, more specifically, lithium, sodium, potassium, calcium, magnesium, and aluminum salts of rosin, may be used. Moreover, as the method of adding the nucleating agent to the polyolefin resin, the nucleating agent may be mixed to the polyolefin resin and milled. As the device for milling, a single screw extruder, a twin screw extruder, a Banbury mixer, a thermal roll, or the like may be used. The temperature of milling is normally 170° C.~300° C., and the time is normally 1 minute~20 minutes. The top lid member 113 and the integrated battery container 114 in the present embodiment may be formed through injection molding.

In the present embodiment, the top lid member 113, the safety valve 120, and the lateral lid member 122 are formed with the polypropylene-based resin and the integrated battery container 114 is formed with the polymer alloy. Alternatively, only the top lid member 113 may be formed with the polypropylene-based resin, only the lateral lid member 122 may be formed with the polypropylene-based resin, only the top lid member 113 and the safety valve 120 may be formed with the polypropylene-based resin, or only the top lid member 113 and the lateral lid member 122 may be formed with the polypropylene-based resin. As already described, with the polymer alloy, the percentage of foreign object deficiency due to generation of carbides during molding is relatively high. More specifically, a black-dot foreign object is generated due to the generation of the carbides, which causes cracks. By forming the top lid member 113 or the lateral lid member 122 with the polypropylene-based resin, it is possible to inhibit generation of the cracks, and to effectively prevent the deficiency due to crack generation in the portion of the top lid member 113 or the lateral lid member 122, in addition to the inhibition of the increase in the manufacturing cost. In particular, normally, the lateral lid member 122 is a part in which more damage due to the generation of the crack tends to occur. In addition, as shown in FIG. 4, in the assembled state as the battery pack, the battery modules are close together, and it is difficult to apply physical strengthening. Because the lateral lid member 122 has such characteristics, the inhibition of the crack generation with the use of the polypropylene-based resin for the lateral lid member 122 is more effective than a configuration where the polypropylene-based resin is used for other parts.

What is claimed is:

1. A sealed-type nickel-metal hydride secondary battery, comprising:
an integrated battery container in which a plurality of battery containers having a rectangular parallelepiped shape with a short-side surface having a narrow width, a long-side surface having a wide width, and an opening on an upper surface, are integrally connected with each other while sharing the short-side surfaces; and
a top lid member which is adhered by heating and fusing to an upper surface of the integrated battery container, wherein
the integrated battery container and the top lid member are made of a polymer alloy having a polyphenylene ether resin and a polyolefin resin as primary constituents, wherein the polymer alloy comprises 20% by weight to 80% by weight of the polyphenylene ether resin,
a lateral lid member which is adhered through heating and fusing to a long-side surface of the integrated battery container is made of a polypropylene-based resin, wherein the polypropylene-based resin comprises approximately 100% by weight of either a single polypropylene polymer, a random co-polymer of propylene-ethylene, or a block co-polymer having a single polymer of propylene and a random co-polymer of propylene-ethylene, and
the polypropylene-based resin is treated with a nucleating agent to increase a mechanical strength of the polypropylene-based resin to achieve thermal property values approximately the same as thermal property values of the polymer alloy, wherein the polypropylene-based resin of the lateral lid member has a melt flow rate MFR under a condition of 250° C. and a load condition of 98 N of 0.4 g/10 min~1.3 g/10 min, and the MFR of the polypropylene-based resin is approximately the same degree as an MFR of the polymer alloy.

2. The sealed-type nickel-metal hydride secondary battery according to claim 1, wherein
the polypropylene-based resin has a weight average molecular weight Mw of greater than or equal to 700000, and a ratio Mw/Mn between the weight average molecular weight Mw and a number average molecular weight Mn of greater than or equal to 4.8.

3. A sealed-type nickel-metal hydride secondary battery, comprising:
an integrated battery container in which a plurality of battery containers having a rectangular parallelepiped shape with a short-side surface having a narrow width, a long-side surface having a wide width, and an opening on an upper surface are integrally connected with each other while sharing the short-side surfaces; and
a top lid member which is adhered by heating and fusing to an upper surface of the integrated battery container, wherein
the integrated battery container is made of a polymer alloy having a polyphenylene ether resin and a polyolefin resin as primary constituents, wherein the polymer alloy comprises 20% by weight to 80% by weight of the polyphenylene ether resin,
the top lid member is made of a polypropylene-based resin, wherein the polypropylene-based resin comprises approximately 100% by weight of either a single polypropylene polymer, a random co-polymer of propylene-ethylene, or a block co-polymer having a single polymer of propylene and a random co-polymer of propylene-ethylene, and
the polypropylene-based resin is treated with a nucleating agent to increase a mechanical strength of the polypropylene-based resin to achieve thermal property values approximately the same as thermal property values of the polymer alloy, wherein the polypropylene-based resin of the top lid member has a melt flow rate MFR under a condition of 250° C. and a load condition of 98

N of 0.4 g/10 min~1.3 g/10 min, and the MFR of the polypropylene-based resin is approximately the same degree as an MFR of the polymer alloy.

4. The sealed-type nickel-metal hydride secondary battery according to claim 3, wherein the polypropylene-based resin has a weight average molecular weight Mw of greater than or equal to 700000, and a ratio Mw/Mn between the weight average molecular weight Mw and a number average molecular weight Mn of greater than or equal to 4.8.

5. The sealed-type nickel-metal hydride secondary battery according to claim 3, wherein a safety valve, which discharges internally generated gas to the outside, is provided on the top lid member, and the safety valve is formed with the same polypropylene-based resin as the top lid member.

* * * * *